(12) United States Patent
Woolward

(10) Patent No.: US 10,009,383 B2
(45) Date of Patent: *Jun. 26, 2018

(54) DATA NETWORK MICROSEGMENTATION

(71) Applicant: vArmour Networks, Inc., Mountain View, CA (US)

(72) Inventor: Marc Woolward, Santa Cruz, CA (US)

(73) Assignee: vArmour Networks, Inc., Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/382,443

(22) Filed: Dec. 16, 2016

(65) Prior Publication Data

US 2017/0374102 A1    Dec. 28, 2017

Related U.S. Application Data

(63) Continuation of application No. 15/192,967, filed on Jun. 24, 2016, now Pat. No. 9,560,081.

(51) Int. Cl.
*H04L 29/06* (2006.01)

(52) U.S. Cl.
CPC .......... *H04L 63/20* (2013.01); *H04L 63/0263* (2013.01)

(58) Field of Classification Search
CPC ........................... H04L 63/20; H04L 63/0263
USPC ........................................................... 726/1
See application file for complete search history.

(56) References Cited

U.S. PATENT DOCUMENTS

| | | |
|---|---|---|
| 6,765,864 B1 | 7/2004 | Natarajan et al. |
| 6,986,061 B1 | 1/2006 | Kunzinger |
| 6,992,985 B1 | 1/2006 | Das |
| 7,058,712 B1 | 6/2006 | Vasko et al. |
| 7,062,566 B2 | 6/2006 | Amara et al. |
| 7,068,598 B1 | 6/2006 | Bryson et al. |

(Continued)

FOREIGN PATENT DOCUMENTS

| | | |
|---|---|---|
| TW | 201702901 A | 1/2017 |
| WO | WO2016148874 A1 | 9/2016 |

(Continued)

OTHER PUBLICATIONS

Final Office Action, dated Jan. 26, 2017, U.S. Appl. No. 14/657,282, filed Mar. 13, 2015.

(Continued)

*Primary Examiner* — Michael S McNally

(74) *Attorney, Agent, or Firm* — Carr & Ferrell LLP

(57) ABSTRACT

Methods and systems for microsegmentation of data networks are provided herein. Exemplary methods include: receiving a high-level declarative policy; getting metadata associated with a plurality of containers from an orchestration layer; determining a low-level firewall rule set using the high-level declarative policy and the metadata; and configuring by a plurality of enforcement points a respective virtual switch of a plurality of virtual switches to process packets in accordance with the low-level firewall ruleset, the virtual switches being collectively communicatively coupled to the plurality of containers, such that network communications between a first group of containers and a second group of containers of the plurality of containers are not permitted, and communications between containers of the first group of containers are permitted.

17 Claims, 10 Drawing Sheets

(56) References Cited

U.S. PATENT DOCUMENTS

| | | |
|---|---|---|
| 7,502,841 B2 | 3/2009 | Small et al. |
| 7,607,170 B2 | 10/2009 | Chesla |
| 7,620,808 B2 | 11/2009 | Le et al. |
| 7,735,141 B1 | 6/2010 | Noel et al. |
| 7,774,837 B2 | 8/2010 | McAlister |
| 7,849,495 B1 | 12/2010 | Huang et al. |
| 7,904,962 B1 | 3/2011 | Jajodia et al. |
| 7,949,677 B2 | 5/2011 | Croft et al. |
| 7,954,150 B2 | 5/2011 | Croft et al. |
| 8,250,213 B2 | 8/2012 | Glover et al. |
| 8,274,912 B2 | 9/2012 | Wray et al. |
| 8,321,862 B2 | 11/2012 | Swamy et al. |
| 8,514,868 B2 | 8/2013 | Hill |
| 8,516,478 B1 | 8/2013 | Edwards et al. |
| 8,612,744 B2 | 12/2013 | Shieh |
| 8,612,971 B1 | 12/2013 | Fitzgerald et al. |
| 8,813,169 B2 | 8/2014 | Shieh et al. |
| 8,918,785 B1 | 12/2014 | Brandwine et al. |
| 8,959,568 B2 | 2/2015 | Hudis et al. |
| 9,038,151 B1 | 5/2015 | Chua et al. |
| 9,098,578 B2 | 8/2015 | Heim et al. |
| 9,380,027 B1 * | 6/2016 | Lian .................. H04L 63/0263 |
| 9,438,634 B1 | 9/2016 | Ross et al. |
| 9,467,476 B1 | 10/2016 | Shieh et al. |
| 9,529,995 B2 | 12/2016 | Shieh |
| 9,560,081 B1 | 1/2017 | Woolward |
| 9,609,026 B2 | 3/2017 | Ross et al. |
| 2001/0014150 A1 | 8/2001 | Beebe et al. |
| 2002/0093527 A1 | 7/2002 | Sherlock et al. |
| 2002/0124067 A1 | 9/2002 | Parupudi et al. |
| 2003/0172145 A1 | 9/2003 | Nguyen |
| 2003/0177389 A1 | 9/2003 | Albert et al. |
| 2003/0204632 A1 | 10/2003 | Willebeek-Lemair et al. |
| 2003/0204728 A1 | 10/2003 | Irwin |
| 2004/0093513 A1 | 5/2004 | Cantrell et al. |
| 2004/0095897 A1 | 5/2004 | Vafaei |
| 2004/0250124 A1 | 12/2004 | Chesla et al. |
| 2005/0010821 A1 | 1/2005 | Cooper et al. |
| 2005/0081058 A1 | 4/2005 | Chang et al. |
| 2005/0160286 A1 | 7/2005 | Currie et al. |
| 2005/0188217 A1 | 8/2005 | Ghanea-Hercock |
| 2005/0193222 A1 | 9/2005 | Greene |
| 2005/0229255 A1 | 10/2005 | Gula et al. |
| 2006/0177063 A1 | 8/2006 | Conway et al. |
| 2007/0079308 A1 | 4/2007 | Chiaramonte et al. |
| 2007/0171921 A1 | 7/2007 | Wookey et al. |
| 2007/0192863 A1 | 8/2007 | Kapoor et al. |
| 2007/0271612 A1 | 11/2007 | Fang et al. |
| 2008/0052774 A1 | 2/2008 | Chesla et al. |
| 2008/0077690 A1 | 3/2008 | Miyajima |
| 2008/0083011 A1 | 4/2008 | McAlister et al. |
| 2008/0155239 A1 | 6/2008 | Chowdhury et al. |
| 2008/0262990 A1 | 10/2008 | Kapoor et al. |
| 2008/0276295 A1 | 11/2008 | Nair |
| 2008/0276297 A1 | 11/2008 | Shay |
| 2008/0301770 A1 | 12/2008 | Kinder |
| 2009/0003278 A1 | 1/2009 | Abdel-Kader et al. |
| 2009/0249472 A1 | 10/2009 | Litvin et al. |
| 2010/0043068 A1 | 2/2010 | Varadhan et al. |
| 2010/0095367 A1 | 4/2010 | Narayanaswamy |
| 2010/0100616 A1 | 4/2010 | Bryson et al. |
| 2010/0100962 A1 | 4/2010 | Boren |
| 2010/0175134 A1 | 7/2010 | Ali-Ahmad et al. |
| 2010/0228962 A1 | 9/2010 | Simon et al. |
| 2010/0235880 A1 | 9/2010 | Chen et al. |
| 2010/0251329 A1 | 9/2010 | Wei |
| 2010/0281533 A1 | 11/2010 | Mao et al. |
| 2011/0003580 A1 | 1/2011 | Belrose et al. |
| 2011/0030037 A1 | 2/2011 | Olshansky et al. |
| 2011/0033271 A1 | 2/2011 | Hanel |
| 2011/0069710 A1 | 3/2011 | Naven et al. |
| 2011/0138384 A1 | 6/2011 | Bozek et al. |
| 2011/0185431 A1 | 7/2011 | Deraison |
| 2011/0214157 A1 | 9/2011 | Korsunsky et al. |
| 2011/0225624 A1 | 9/2011 | Sawhney et al. |
| 2011/0261722 A1 | 10/2011 | Awano |
| 2011/0263238 A1 | 10/2011 | Riley et al. |
| 2011/0277034 A1 | 11/2011 | Hanson |
| 2011/0299533 A1 | 12/2011 | Yu et al. |
| 2011/0314520 A1 | 12/2011 | Olszewski et al. |
| 2012/0017258 A1 | 1/2012 | Suzuki |
| 2012/0131685 A1 | 5/2012 | Broch et al. |
| 2012/0167161 A1 | 6/2012 | Kim |
| 2012/0210417 A1 | 8/2012 | Shieh |
| 2012/0240185 A1 | 9/2012 | Kapoor et al. |
| 2012/0254980 A1 | 10/2012 | Takahashi |
| 2012/0287931 A1 | 11/2012 | Kidambi et al. |
| 2012/0297073 A1 | 11/2012 | Glover et al. |
| 2012/0311144 A1 | 12/2012 | Akelbein et al. |
| 2012/0311575 A1 | 12/2012 | Song |
| 2013/0007234 A1 | 1/2013 | Bartfai-Walcott et al. |
| 2013/0019277 A1 | 1/2013 | Chang et al. |
| 2013/0055246 A1 | 2/2013 | Li et al. |
| 2013/0055398 A1 | 2/2013 | Li et al. |
| 2013/0091577 A1 | 4/2013 | McGinley et al. |
| 2013/0097692 A1 | 4/2013 | Cooper et al. |
| 2013/0108050 A1 | 5/2013 | Wu et al. |
| 2013/0117836 A1 | 5/2013 | Shieh |
| 2013/0125112 A1 | 5/2013 | Mittal et al. |
| 2013/0174246 A1 | 7/2013 | Schrecker et al. |
| 2013/0254871 A1 | 9/2013 | Sun et al. |
| 2013/0275592 A1 | 10/2013 | Xu et al. |
| 2013/0283370 A1 | 10/2013 | Vipat et al. |
| 2013/0298184 A1 | 11/2013 | Ermagan et al. |
| 2013/0305357 A1 | 11/2013 | Ayyagari et al. |
| 2013/0340039 A1 | 12/2013 | Malaney |
| 2014/0013434 A1 | 1/2014 | Ranum et al. |
| 2014/0033271 A1 | 1/2014 | Barton et al. |
| 2014/0137184 A1 | 5/2014 | Russello et al. |
| 2014/0149569 A1 | 5/2014 | Wittenstein et al. |
| 2014/0230008 A1 * | 8/2014 | Feroz .................. H04L 63/20 726/1 |
| 2015/0089623 A1 | 3/2015 | Sondhi et al. |
| 2015/0150072 A1 | 5/2015 | Doctor et al. |
| 2015/0281274 A1 | 10/2015 | Masurekar et al. |
| 2015/0281347 A1 | 10/2015 | Wang et al. |
| 2015/0304354 A1 | 10/2015 | Rogers et al. |
| 2015/0326589 A1 | 11/2015 | Smith |
| 2016/0269425 A1 | 9/2016 | Shieh et al. |
| 2017/0063791 A1 | 3/2017 | Ross et al. |
| 2017/0063933 A1 | 3/2017 | Shieh et al. |
| 2017/0163688 A1 | 6/2017 | Ross et al. |

FOREIGN PATENT DOCUMENTS

| | | |
|---|---|---|
| WO | WO2017040148 A1 | 3/2017 |
| WO | WO2017040205 A1 | 3/2017 |

OTHER PUBLICATIONS

Non-Final Office Action, dated Mar. 17, 2017, U.S. Appl. No. 15/387,584, filed Dec. 21, 2016.

International Search Report dated May 5, 2016 in Patent Cooperation Treaty Application No. PCT/US2016/019882 filed Feb. 26, 2016, pp. 1-12.

Patent Cooperation Treaty Application No. PCT/US2016/048412, "International Search Report" and "Written Opinion of the International Searching Authority," dated Nov. 4, 2016, 10 pages.

Patent Cooperation Treaty Application No. PCT/US2016/048711, "International Search Report" and "Written Opinion of the International Searching Authority," dated Nov. 4, 2016, 10 pages.

Non-Final Office Action, dated Jan. 22, 2013, U.S. Appl. No. 13/288,872, filed Nov. 3, 2011.

Non-Final Office Action, dated Feb. 13, 2013, U.S. Appl. No. 13/363,088, filed Jan. 31, 2012.

Non-Final Office Action, dated May 8, 2013, U.S. Appl. No. 13/291,739, filed Nov. 8, 2011.

Final Office Action, dated Jun. 24, 2013, U.S. Appl. No. 13/288,872, filed Nov. 3, 2011.

Notice of Allowance, dated Aug. 16, 2013, U.S. Appl. No. 13/363,088, filed Jan. 31, 2012.

(56) References Cited

OTHER PUBLICATIONS

Final Office Action, dated Oct. 16, 2013, U.S. Appl. No. 13/291,739, filed Nov. 8, 2011.
Non-Final Office Action, dated Oct. 28, 2013, U.S. Appl. No. 13/288,872, filed Nov. 3, 2011.
Notice of Allowance, dated Apr. 11, 2014, U.S. Appl. No. 13/288,872, filed Nov. 3, 2011.
Non-Final Office Action, dated Jun. 23, 2014, U.S. Appl. No. 13/849,315, filed Mar. 22, 2013.
Non-Final Office Action, dated Oct. 21, 2014, U.S. Appl. No. 13/291,739, filed Nov. 8, 2011.
Final Office Action, dated Dec. 30, 2014, U.S. Appl. No. 13/849,315, filed Mar. 22, 2013.
Final Office Action, dated May 19, 2015, U.S. Appl. No. 13/291,739, filed Nov. 8, 2011.
Non-Final Office Action, dated Jun. 4, 2015, U.S. Appl. No. 13/849,315, filed Mar. 22, 2013.
Non-Final Office Action, dated Oct. 27, 2015, U.S. Appl. No. 13/291,739, filed Nov. 8, 2011.
Non-Final Office Action, dated Nov. 25, 2015, U.S. Appl. No. 14/839,699, filed Aug. 28, 2015.
Final Office Action, dated Dec. 2, 2015, U.S. Appl. No. 13/849,315, filed Mar. 22, 2013.
Non-Final Office Action, dated Feb. 19, 2016, U.S. Appl. No. 14/839,649, filed Aug. 28, 2015.
Notice of Allowance, dated Apr. 27, 2016, U.S. Appl. No. 14/839,699, filed Aug. 28, 2015.
Notice of Allowance, dated Jun. 6, 2016, U.S. Appl. No. 14/839,649, filed Aug. 28, 2015.
Non-Final Office Action, dated Aug. 30, 2016, U.S. Appl. No. 14/657,282, filed Mar. 13, 2015.
Notice of Allowance, dated Sep. 15, 2016, U.S. Appl. No. 15/192,967, filed Jun. 24, 2016.
Notice of Allowance, dated May 20, 2016, U.S. Appl. No. 13/291,739, filed Nov. 8, 2011.
Notice of Allowance, dated Apr. 18, 2016, U.S. Appl. No. 13/849,315, filed Mar. 22, 2013.
Notice of Allowance, dated Nov. 4, 2016, U.S. Appl. No. 15/219,273, filed Jul. 25, 2016.
Non-Final Office Action, dated Jun. 6, 2017, U.S. Appl. No. 14/657,282, filed Mar. 13, 2015.
Notice of Allowance, dated Jun. 22, 2017, U.S. Appl. No. 15/387,584, filed Dec. 21, 2016.
Non-Final Office Action, dated Jun. 27, 2017, U.S. Appl. No. 15/441,156, filed Feb. 23, 2017.
Non-Final Office Action, dated Jul. 12, 2017, U.S. Appl. No. 15/255,132, filed Sep. 1, 2016.

\* cited by examiner

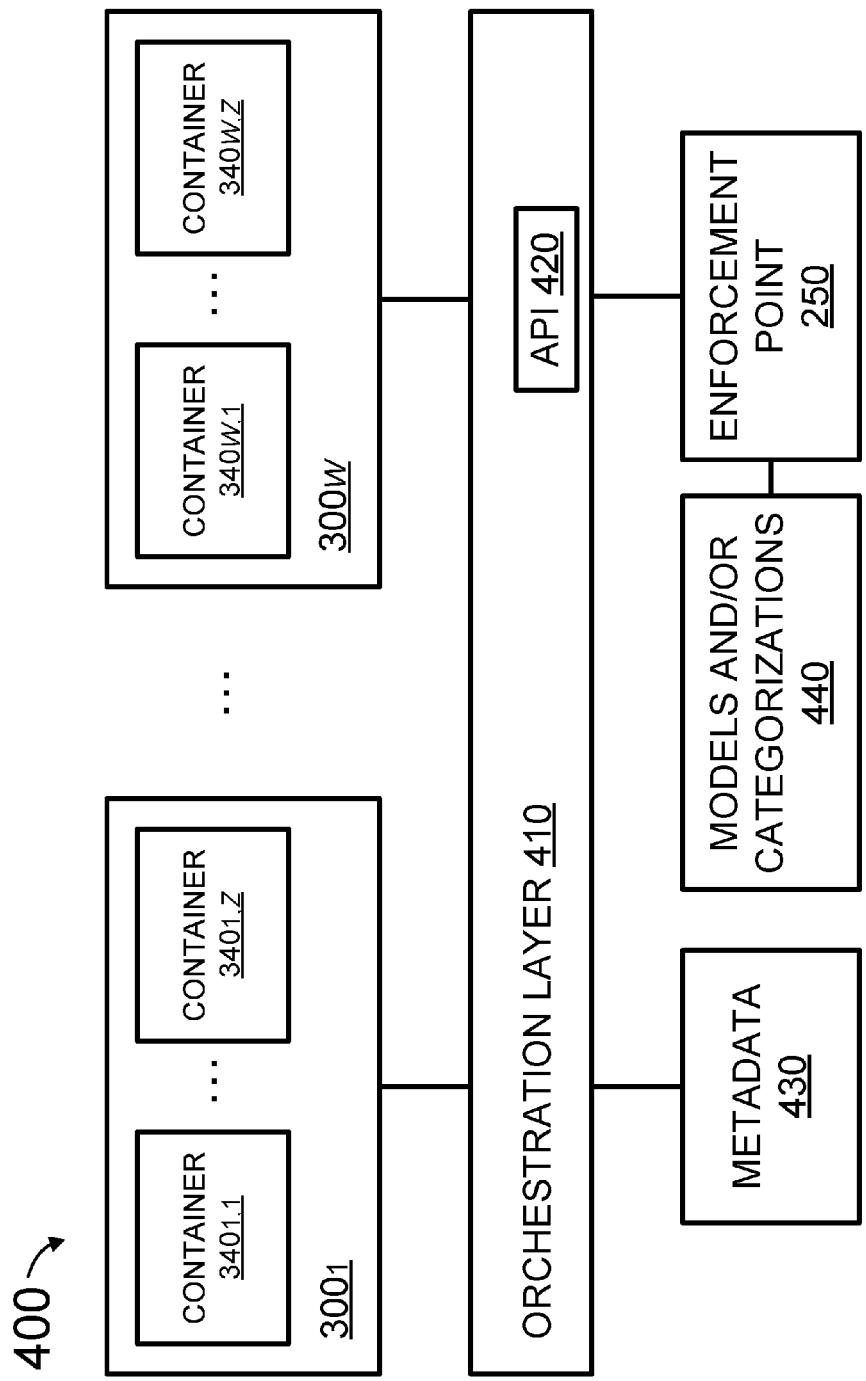

```
500A kubectl get services
NAME             LABELS                                   SELECTOR    IP               PORT
kubernetes-ro    component=apiserver,provider=kubernetes  <none>      10.254.47.161    80
kubernetes       component=apiserver,provider=kubernetes  <none>      10.254.153.242   443

(and at an image level)
desiredState:
    replicas: 1
    replicaSelector:
        selectorname: "webserver"
    podTemplate:
        desiredState:
            manifest:
                version: "v1beta1"
                id: "webserver-controller"
                containers:
                    - name: "apache-frontend"
                      image: "webwithdb"
                      ports:
                          - containerPort: 80
                            hostPort: 80
```

FIG. 5A

| Service Type | Protocols/Common Ports | Target (allowed communication partners) | Direction | Application Payload / Message Semantics |
|---|---|---|---|---|
| Web Server (IIS, Apache) | HTTP/80 | User Devices | Incoming | HTTP |
| | SMB (tcp/445), NFS (tcp/2049) | File Servers | Outbound | SMB, NFS |
| | Common secure mgmt applications | Infrastructure Mgmt devices | Incoming | Ssh, ICMP |
| File Server (HFS) | HTTP/80 | application servers | incoming | http1.1 and above, SMB, NFS |
| | Common secure mgmt applications | Infrastructure Mgmt devices | Incoming | Ssh, ICMP |
| Postgress SQL server | tcp/5432 | application servers | incoming | postgress SQL |
| | tcp/5432 | postgres SQL servers | incoming / outbound | postgres SQL replication |
| | Common secure mgmt applications | Infrastructure Mgmt devices | Incoming | Ssh, ICMP |
| | iscsi tcp/860 | iSCSI target | Outgoing | iscsi |
| iSCSI Server (Openfiler) | iscsi/860 | postgres SQL servers | Incoming | iscsi |
| | Common secure mgmt applications | Infrastructure Mgmt devices | Incoming | Ssh, ICMP |
| RabbitMQ | amqp tcp/5672 | application servers | incoming | amqp 0.9.1 or obove |
| | Common secure mgmt applications | Infrastructure Mgmt devices | Incoming | Ssh, ICMP |
| | dns tcp, udp/53 | DNS servers | Outbound | DNS name resolution |
| OpenDNS | dns tcp,udp/53 | Any | Inbound/outbound | DNS name resolution |
| | Common secure mgmt applications | Infrastructure Mgmt devices | Incoming | Ssh, ICMP |
| | dhcp udp/67-68 | Any | Incoming / Outbound | DHCP |

FIG. 5B

DATA NETWORK MICROSEGMENTATION

CROSS-REFERENCE TO RELATED APPLICATIONS

This application is a continuation of U.S. patent application Ser. No. 15/192,967, filed Jun. 24, 2016, now U.S. Pat. No. 9,560,081, issued Jan. 31, 2017, which is hereby incorporated by reference herein in its entirety, including all references and appendices cited therein.

FIELD OF THE INVENTION

The present technology pertains to computer security, and more specifically to computer network security.

BACKGROUND ART

A hardware firewall is a network security system that controls incoming and outgoing network traffic. A hardware firewall generally creates a barrier between an internal network (assumed to be trusted and secure) and another network (e.g., the Internet) that is assumed not to be trusted and secure.

Attackers breach internal networks to steal critical data. For example, attackers target low-profile assets to enter the internal network. Inside the internal network and behind the hardware firewall, attackers move laterally across the internal network, exploiting East-West traffic flows, to critical enterprise assets. Once there, attackers siphon off valuable company and customer data.

SUMMARY OF THE INVENTION

Some embodiments of the present technology include computer-implemented methods for microsegmentation of data networks which may include: receiving a high-level declarative policy, the high-level security policy based on metadata associated with a plurality of containers from an orchestration layer; determining a low-level firewall rule set using the high-level declarative policy; and configuring by a plurality of enforcement points a respective virtual switch of a plurality of virtual switches to process packets in accordance with the low-level firewall rule set, the virtual switches being collectively communicatively coupled to the plurality of containers, such that network communications between a first group of containers and a second group of containers of the plurality of containers are restricted by a first set of characteristics, and communications between containers of the first group of containers are at least one of permitted and restricted by a second set of characteristics.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 4 is a simplified block diagram of an environment, in accordance with various embodiments.

FIG. 5A illustrates example metadata, according to some embodiments.

FIG. 5B is a table of example expected behaviors in accordance with some embodiments.

DETAILED DESCRIPTION

Figure 1:
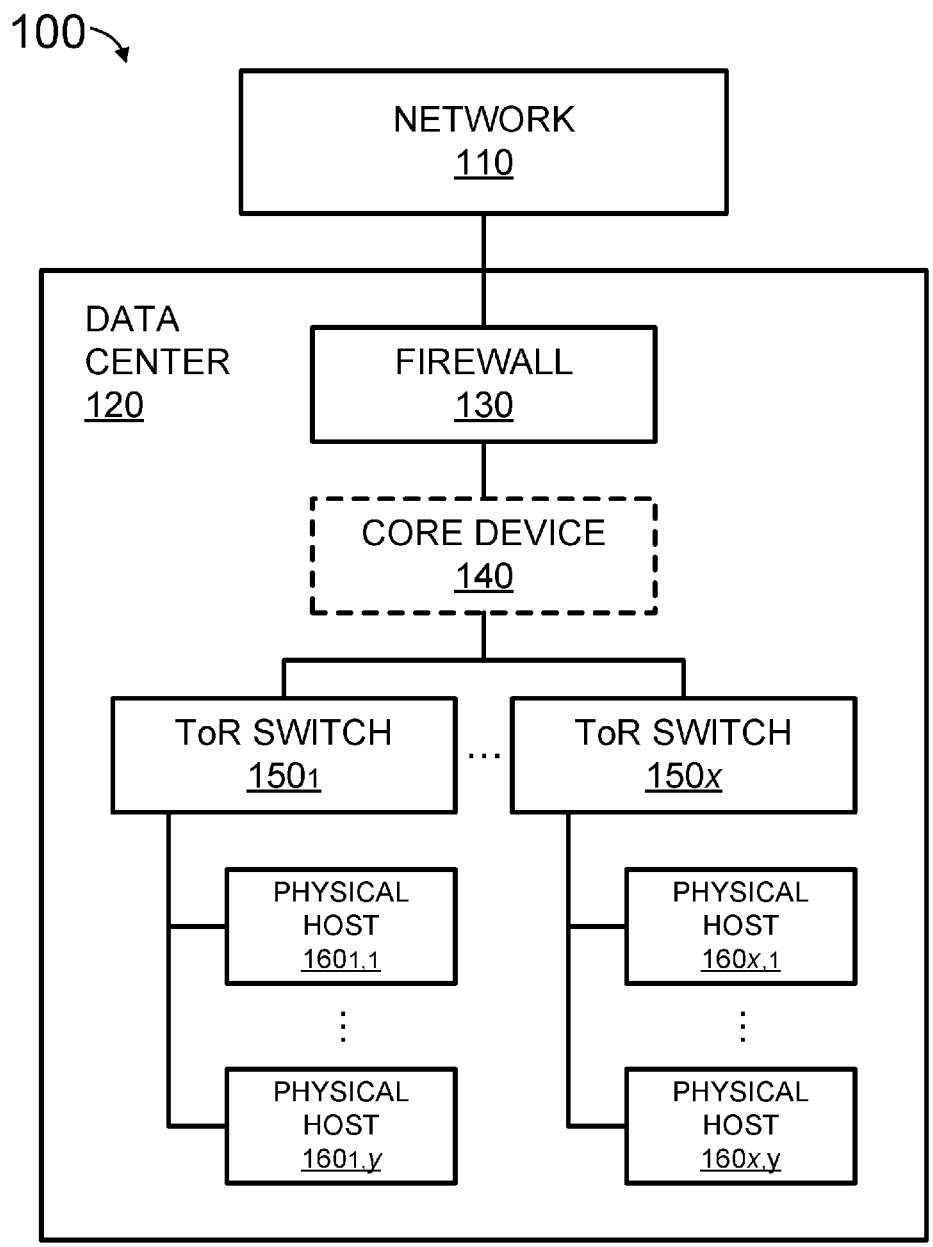
FIG. 1 is a simplified block diagram of an (physical) environment, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Information technology (IT) organizations face cyber threats and advanced attacks. Firewalls are an important part of network security. Firewalls control incoming and outgoing network traffic using a rule set. A rule, for example, allows a connection to a specific (Internet Protocol (IP)) address (and/or port), allows a connection to a specific (IP) address (and/or port) if the connection is secured (e.g., using Internet Protocol security (IPsec)), blocks a connection to a specific (IP) address (and/or port), redirects a connection from one IP address (and/or port) to another IP address (and/or port), logs communications to and/or from a specific IP address (and/or port), and the like. A firewall rule at a low level of abstraction may indicate a specific (IP) address and protocol to which connections are allowed and/or not allowed.

Managing a set of firewall rules is a difficult challenge. Some IT security organizations have a large staff (e.g., dozens of staff members) dedicated to maintaining firewall policy (e.g., a firewall rule set). A firewall rule set can have tens of thousands or even hundreds of thousands of rules. Some embodiments of the present technology may autonomically generate a reliable declarative security policy at a high level of abstraction. Abstraction is a technique for managing complexity by establishing a level of complexity which suppresses the more complex details below the current level. The high-level declarative policy may be compiled to produce a firewall rule set at a low level of abstraction.

FIG. 1 illustrates a system 100 according to some embodiments. System 100 includes network 110 and data center 120. In various embodiments, data center 120 includes firewall 130, optional core switch/router (also referred to as a core device) 140, Top of Rack (ToR) switches $150_1$-$150_x$, and physical hosts $160_{1,1}$-$160_{x,y}$.

Network 110 (also referred to as a computer network or data network) is a telecommunications network that allows computers to exchange data. For example, in network 110, networked computing devices pass data to each other along data connections (e.g., network links). Data can be transferred in the form of packets. The connections between nodes may be established using either cable media or wireless media. For example, network 110 includes at least one of a local area network (LAN), wireless local area network (WLAN), wide area network (WAN), metropolitan area network (MAN), and the like. In some embodiments, network 110 includes the Internet.

Data center 120 is a facility used to house computer systems and associated components. Data center 120, for example, comprises computing resources for cloud computing services or operated for the benefit of a particular organization. Data center equipment, for example, is generally mounted in rack cabinets, which are usually placed in single rows forming corridors (e.g., aisles) between them. Firewall 130 creates a barrier between data center 120 and network 110 by controlling incoming and outgoing network traffic based on a rule set.

Optional core switch/router 140 is a high-capacity switch/router that serves as a gateway to network 110 and provides communications between ToR switches $150_1$ and $150_x$, and between ToR switches $150_1$ and $150_x$ and network 110. ToR switches $150_1$ and $150_x$ connect physical hosts $160_{1,1}$-$160_{1,y}$ and $160_{x,1}$-$160_{x,y}$ (respectively) together and to network 110 (optionally through core switch/router 140). For example, ToR switches $150_1$-$150_x$ use a form of packet switching to forward data to a destination physical host (of physical hosts $160_{1,1}$-$160_{x,y}$) and (only) transmit a received message to the physical host for which the message was intended.

In some embodiments, physical hosts $160_{1,1}$-$160_{x,y}$ are computing devices that act as computing servers such as blade servers. For example, physical hosts $160_{1,1}$-$160_{x,y}$ comprise physical servers performing the operations described herein, which can be referred to as a bare-metal server environment. Additionally or alternatively, physical hosts $160_{1,1}$-$160_{x,y}$ may be a part of a cloud computing environment. By way of further non-limiting example, physical hosts $160_{1,1}$-$160_{x,y}$ can host different combinations and permutations of virtual and container environments (which can be referred to as a virtualization environment), which are described further below in relation to FIGS. 2-4.

Figure 2:
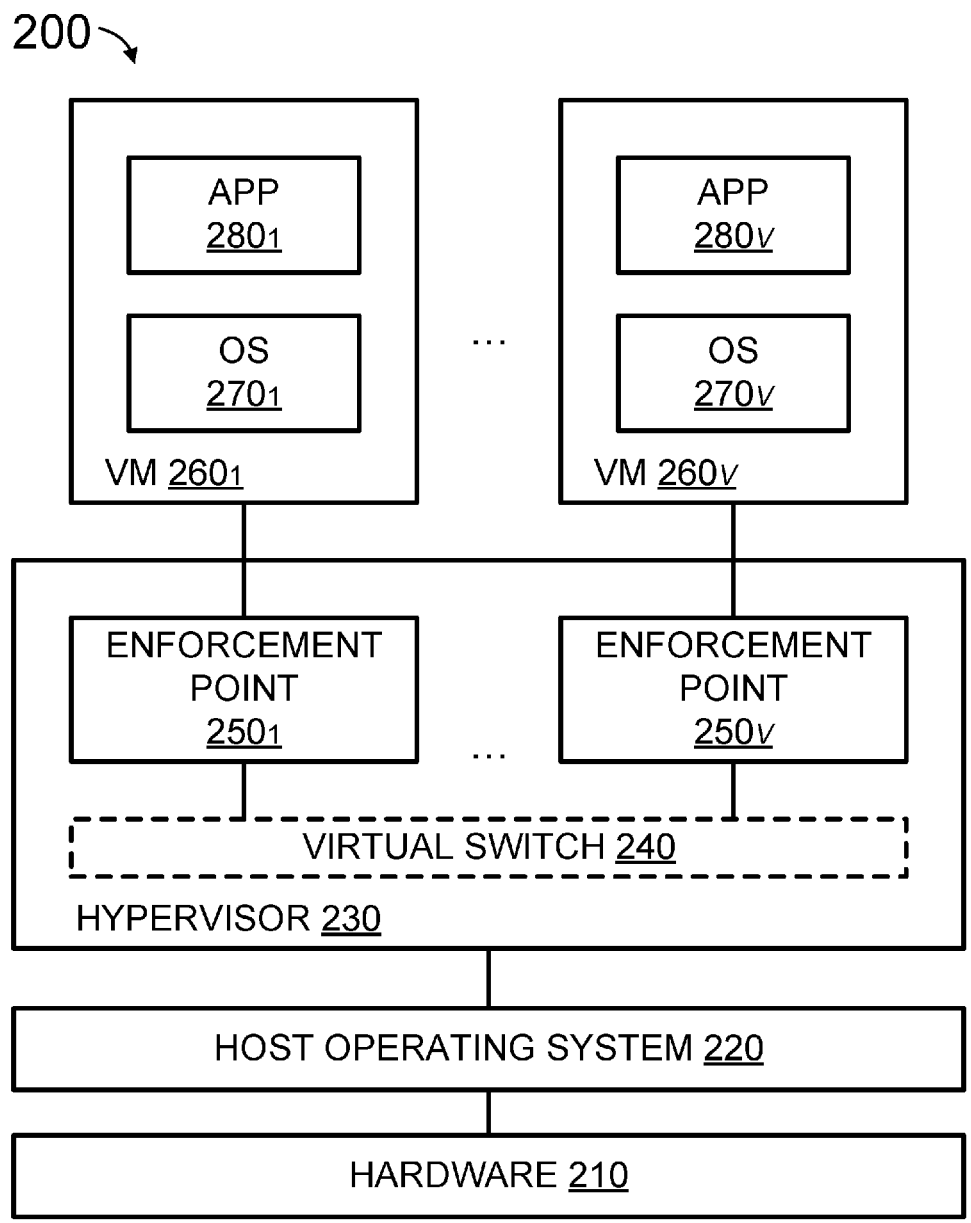
FIG. 2 is simplified block diagram of an (virtual) environment, in accordance with some embodiments.

FIG. 2 depicts (virtual) environment 200 according to various embodiments. In some embodiments, environment 200 is implemented in at least one of physical hosts $160_{1,1}$-$160_{x,y}$ (FIG. 1). Environment 200 includes hardware 210, host operating system (OS) 220, hypervisor 230, and virtual machines (VMs) $260_1$-$260_V$. In some embodiments, hardware 210 is implemented in at least one of physical hosts $160_{1,1}$-$160_{x,y}$ (FIG. 1). Host operating system 220 can run on hardware 210 and can also be referred to as the host kernel. Hypervisor 230 optionally includes virtual switch 240 and includes enforcement points $250_1$-$250_V$. VMs $260_1$-$260_V$ each include a respective one of operating systems (OSes) $270_1$-$270_V$ and applications (APPs) $280_1$-$280_V$.

Hypervisor (also known as a virtual machine monitor (VMM)) 230 is software running on at least one of physical hosts $160_{1,1}$-$160_{x,y}$ (FIG. 1), and hypervisor 230 runs VMs $260_1$-$260_V$. A physical host (of physical hosts $160_{1,1}$-$160_{x,y}$ (FIG. 1)) on which hypervisor 230 is running one or more virtual machines $260_1$-$260_V$, is also referred to as a host machine. Each VM (from VMs $260_1$-$260_V$) can also be referred to as a guest machine.

For example, hypervisor 230 allows multiple OSes $270_1$-$270_V$ to share a single physical host (of physical hosts $160_{1,1}$-$160_{x,y}$ (FIG. 1)). Each of OSes $270_1$-$270_V$ appears to have the host machine's processor, memory, and other resources all to itself. However, hypervisor 230 actually controls the host machine's processor and resources, allocating what is needed to each operating system in turn and making sure that the guest OSes (e.g., VMs $260_1$-$260_V$) cannot disrupt each other.

VMs $260_1$-$260_V$ also include applications $280_1$-$280_V$. Applications (and/or services) $280_1$-$280_V$ are programs designed to carry out operations for a specific purpose. Applications $280_1$-$280_V$ can include at least one of web application (also known as web apps), web server, transaction processing, database, and the like software. Applications $280_1$-$280_V$ run using a respective OS of OSes $270_1$-$270_V$.

Hypervisor 230 optionally includes virtual switch 240. Virtual switch 240 is a logical switching fabric for networking VMs $260_1$-$260_V$. For example, virtual switch 240 is a program running on a physical host (of physical hosts $160_{1,1}$-$160_{x,y}$ (FIG. 1)) that allows a VM (of VMs $260_1$-$260_V$) to communicate with another VM.

Hypervisor 230 also includes enforcement points $250_1$-$250_V$, according to some embodiments. For example, enforcement points $250_1$-$250_V$ are a firewall service that provides network traffic filtering and monitoring for VMs $260_1$-$260_V$ and containers (described below in relation to FIGS. 3 and 4). Enforcement points $250_1$-$250_V$ are described further in related U.S. Patent Application "Methods and Systems for Orchestrating Physical and Virtual Switches to Enforce Security Boundaries" (application Ser. No. 14/677,827) filed Apr. 2, 2015, which is hereby incorporated by reference for all purposes. Although enforcement points $250_1$-$250_V$ are shown in hypervisor 230, enforcement points $250_1$-$250_V$ can additionally or alternatively be realized in one or more containers (described below in relation to FIGS. 3 and 4).

According to some embodiments, enforcement points $250_1$-$250_V$ control network traffic to and from a VM (of VMs $260_1$-$260_V$) (and/or a container) using a rule set. A rule, for example, allows a connection to a specific (IP) address, allows a connection to a specific (IP) address if the connection is secured (e.g., using IPsec), denies a connection to a specific (IP) address, redirects a connection from one IP address to another IP address (e.g., to a honeypot or tar pit), logs communications to and/or from a specific IP address, and the like. Each address is virtual, physical, or both. Connections are incoming to the respective VM (or a container), outgoing from the respective VM (or container), or both. Redirection is described further in related U.S.

Patent Application "System and Method for Threat-Driven Security Policy Controls" (application Ser. No. 14/673,679) filed Mar. 30, 2015, which is hereby incorporated by reference for all purposes.

In some embodiments logging includes metadata associated with action taken by an enforcement point (of enforcement points $250_1$-$250_V$), such as the permit, deny, and log behaviors. For example, for a Domain Name System (DNS) request, metadata associated with the DNS request, and the action taken (e.g., permit/forward, deny/block, redirect, and log behaviors) are logged. Activities associated with other (application-layer) protocols (e.g., Dynamic Host Configuration Protocol (DHCP), Domain Name System (DNS), File Transfer Protocol (FTP), Hypertext Transfer Protocol (HTTP), Internet Message Access Protocol (IMAP), Post Office Protocol (POP), Secure Shell (SSH), Secure Sockets Layer (SSL), Transport Layer Security (TLS), telnet, Remote Desktop Protocol (RDP), Server Message Block (SMB), and the like) and their respective metadata may be additionally or alternatively logged. For example, metadata further includes at least one of a source (IP) address and/or hostname, a source port, destination (IP) address and/or hostname, a destination port, protocol, application, and the like.

Figure 3:
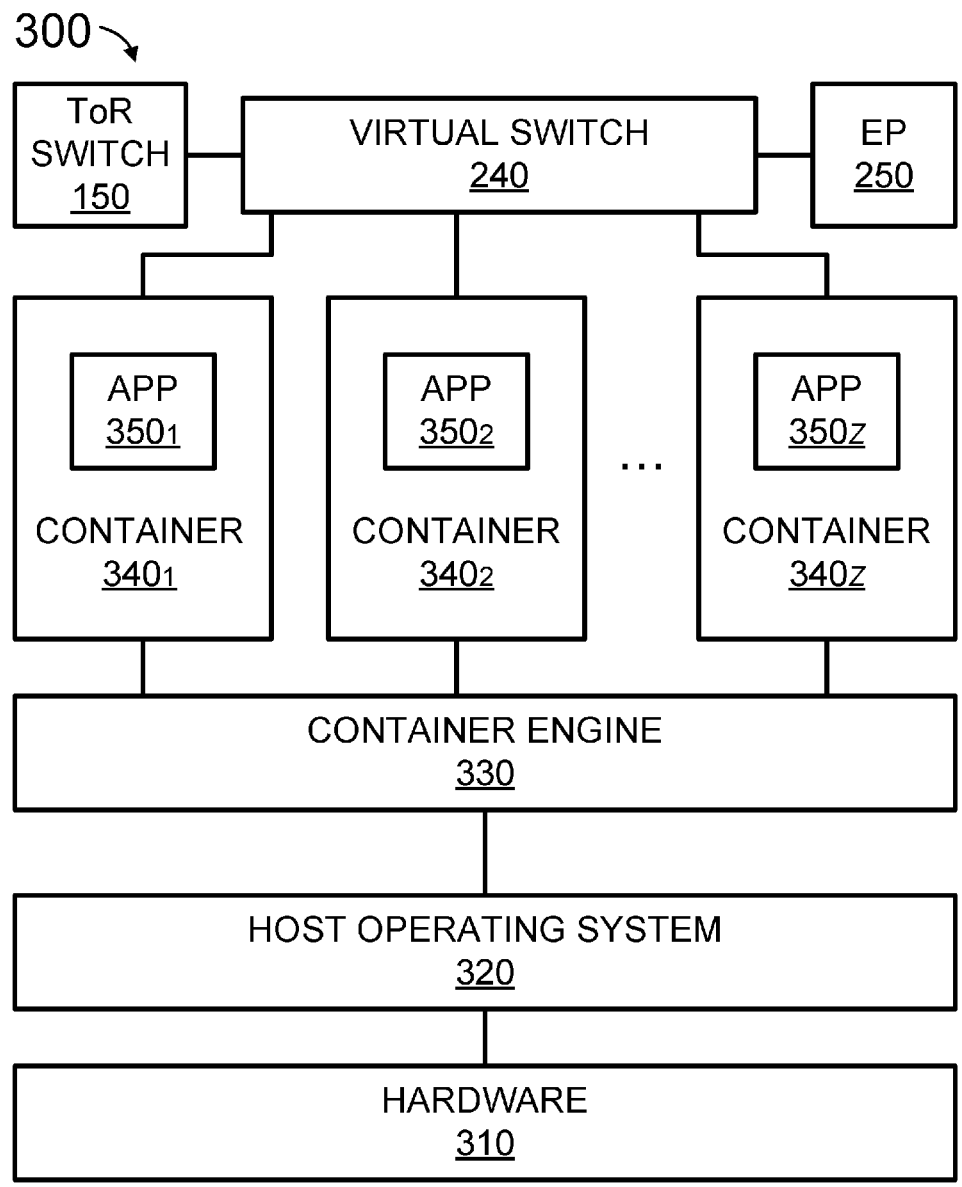
FIG. 3 is simplified block diagram of an environment, according to various embodiments.

FIG. 3 depicts environment 300 according to various embodiments. Environment 300 includes hardware 310, host operating system 320, container engine 330, containers $340_1$-$340_z$, virtual switch 240, ToR switch 150, and enforcement point 250. In some embodiments, hardware 310 is implemented in at least one of physical hosts $160_{1,1}$-$160_{x,y}$ (FIG. 1). Host operating system 320 runs on hardware 310 and can also be referred to as the host kernel. By way of non-limiting example, host operating system 320 can be at least one of: Linux, Red Hat® Enterprise Linux® Atomic Enterprise Platform, CoreOS®, Ubuntu® Snappy, Pivotal Cloud Foundry®, Oracle® Solaris, and the like. Host operating system 320 allows for multiple (instead of just one) isolated user-space instances (e.g., containers $340_1$-$340_z$) to run in host operating system 320 (e.g., a single operating system instance).

Host operating system 320 can include a container engine 330. Container engine 330 can create and manage containers $340_1$-$340_z$, for example, using an (high-level) application programming interface (API). By way of non-limiting example, container engine 330 is at least one of Docker®, Rocket (rkt), Solaris Containers, and the like. For example, container engine 330 may create a container (e.g., one of containers $340_1$-$340_z$) using an image. An image can be a (read-only) template comprising multiple layers and can be built from a base image (e.g., for host operating system 320) using instructions (e.g., run a command, add a file or directory, create an environment variable, indicate what process (e.g., application or service) to run, etc.). Each image may be identified or referred to by an image type. In some embodiments, images (e.g., different image types) are stored and delivered by a system (e.g., server side application) referred to as a registry or hub (not shown in FIG. 3).

Container engine 330 can allocate a filesystem of host operating system 320 to the container and add a read-write layer to the image. Container engine 330 can create a network interface that allows the container to communicate with hardware 310 (e.g., talk to a local host). Container engine 330 can set up an Internet Protocol (IP) address for the container (e.g., find and attach an available IP address from a pool). Container engine 330 can launch a process (e.g., application or service) specified by the image (e.g., run an application, such as one of APPs $350_1$-$350_z$, described further below). Container engine 330 can capture and provide application output for the container (e.g., connect and log standard input, outputs and errors). The above examples are only for illustrative purposes and are not intended to be limiting.

Containers $340_1$-$340_z$ can be created by container engine 330. In some embodiments, containers $340_1$-$340_z$, are each an environment as close as possible to an installation of host operating system 320, but without the need for a separate kernel. For example, containers $340_1$-$340_z$ share the same operating system kernel with each other and with host operating system 320. Each container of containers $340_1$-$340_z$ can run as an isolated process in user space on host operating system 320. Shared parts of host operating system 320 can be read only, while each container of containers $340_1$-$340_z$ can have its own mount for writing.

Containers $340_1$-$340_z$ can include one or more applications (APPs) $350_1$-$350_z$ (and all of their respective dependencies). APPs $350_1$-$350_z$ can be any application or service. By way of non-limiting example, APPs $350_1$-$350_z$ can be a database (e.g., Microsoft® SQL Server®, MongoDB, HTFS, etc.), email server (e.g., Sendmail®, Postfix, qmail, Microsoft® Exchange Server, etc.), message queue (e.g., Apache® Qpid™, RabbitMQ®, etc.), web server (e.g., Apache® HTTP Server™, Microsoft® Internet Information Services (IIS), Nginx, etc.), Session Initiation Protocol (SIP) server (e.g., Kamailio® SIP Server, Avaya® Aura® Application Server 5300, etc.), other media server (e.g., video and/or audio streaming, live broadcast, etc.), file server (e.g., Linux server, Microsoft® Windows Server®, etc.), service-oriented architecture (SOA) and/or microservices process, object-based storage (e.g., Lustre®, EMC® Centera, Scality® RING®, etc.), directory service (e.g., Microsoft® Active Directory®, Domain Name System (DNS) hosting service, etc.), and the like.

Virtual switch 240 is a logical switching fabric for networking containers $340_1$-$340_z$. For example, virtual switch allows a container (of containers $340_1$-$340_z$) to communicate with another container. By way of further non-limiting example, virtual switch 240 is communicatively coupled to ToR switch 150. In this way, containers $340_1$-$340_z$ can communicate with other devices such as VMs (e.g., VMs $260_1$-$260_V$ (FIG. 2)) and bare-metal servers (e.g., within data center 120 and/or over network 110 (FIG. 1)). In some embodiments, virtual switch 240 executes as a part of host operating system 320.

Enforcement point 250 can be run in a container (e.g., of containers $340_1$-$340_z$) and/or a VM (of VMs $260_1$-$260_V$). In some embodiments, enforcement point 250 is advantageously run on a container close in physical proximity to other containers whose communications are controlled by enforcement point 250. As shown in FIG. 3, virtual switch 240 can be communicatively coupled to enforcement point 250.

Enforcement point 250 can program virtual switch 240 to control communications flow (e.g., data packets) to, from, and among containers $340_1$-$340_z$. In various embodiments, virtual switch 240 can be programmed to forward communications directed to and/or from containers $340_1$-$340_z$ to enforcement point 250 for analysis. In other words, virtual switch 240 can be programmed such that communications traffic (e.g., data packets) are forwarded to enforcement point 250. For example, enforcement point 250 programs forwarding rules into virtual switch 240. By way of further non-limiting example, enforcement point 250 programs overflow rules and/or deploys a Linux bridge topology into virtual switch 240. As described above in relation to FIG. 2, enforcement point 250 can control network traffic to and from containers $340_1$-$340_z$, for example, using a rule set.

Enforcement point 250 can analyze communications traffic (e.g., data packets) forwarded by virtual switch 240. In some embodiments, enforcement point 250 can perform stateful packet inspection (SPI), stateless, and application aware inspection of the forwarded communications traffic. Stateful packet inspection can watch traffic streams from end to end and be aware of current communication paths (e.g., data traffic patterns and/or flows). Stateless packet inspection can rely on source and destination addresses or other static values. Application aware inspection includes, for example, AppID (described below).

Each of VMs $260_1$-$260_V$ (FIG. 2) and containers $340_1$-$340_z$ can be referred to as workloads and/or endpoints. In contrast to hypervisor-based virtualization VMs $260_1$-$260_V$ (FIG. 2), containers $340_1$-$340_z$ may be an abstraction performed at the operating system (OS) level, whereas VMs are an abstraction of physical hardware. Since VMs $260_1$-$260_V$ (FIG. 2) can virtualize hardware, each VM instantiation of VMs $260_1$-$260_V$ (FIG. 2) can have a full server hardware stack from virtualized Basic Input/Output System (BIOS) to virtualized network adapters, storage, and central processing unit (CPU). The entire hardware stack means that each VM of VMs $260_1$-$260_V$ (FIG. 2) needs its own complete OS instantiation and each VM must boot the full OS. Although FIG. 3 depicts containers $340_1$-$340_z$ running on hardware 310 (e.g., a physical host of physical hosts $160_{1,1}$-$160_{x,y}$ (FIG. 1)), host operating system 320, container engine 330, and containers $340_1$-$340_z$ may additionally or alternatively run on VM (e.g., one of VMs $260_1$-$260_V$ (FIG. 2)).

FIG. 4 illustrates environment 400, according to some embodiments. Environment 400 can include one or more of enforcement point 250, environments $300_1$-$300_W$, orchestration layer 410, metadata 430, and models (and/or categorizations) 440. Enforcement point 250 can be an enforcement point as described in relation to enforcement points $250_1$-$250_V$ (FIG. 2). Environments $300_1$-$300_W$ can be instances of environment 300 (FIG. 3), include containers $340_{1,1}$-$340_{W,Z}$, and be in at least one of data center 120 (FIG. 1). Containers $340_{1,1}$-$340_{W,Z}$ (e.g., in a respective environment of environments $300_1$-$300_W$) can be a container as described in relation to containers $340_1$-$340_Z$ (FIG. 3).

Orchestration layer 410 can manage and deploy containers $340_{1,1}$-$340_{W,Z}$ across one or more environments $300_1$-$300_W$ in one or more data centers of data center 120 (FIG. 1). In some embodiments, to manage and deploy containers $340_{1,1}$-$340_{W,Z}$, orchestration layer 410 receives one or more image types (e.g., named images) from a data storage and content delivery system referred to as a registry or hub (not shown in FIG. 4). By way of non-limiting example, the registry can be the Google Container Registry. In various embodiments, orchestration layer 410 determines which environment of environments $300_1$-$300_W$ should receive each container of containers $340_{1,1}$-$340_{W,Z}$ (e.g., based on the environments' $300_1$-$300_W$ current workload and a given redundancy target). Orchestration layer 410 can provide means of discovery and communication between containers $340_{1,1}$-$340_{W,Z}$. According to some embodiments, orchestration layer 410 runs virtually (e.g., in one or more containers $340_{1,1}$-$340_{W,Z}$ orchestrated by a different one of orchestration layer 410 and/or in one or more of hypervisor 230 (FIG. 2)) and/or physically (e.g., in one or more physical hosts of physical hosts $160_{1,1}$-$160_{x,y}$ (FIG. 1) in one or more data centers of data center 120 (FIG. 1). By way of non-limiting example, orchestration layer 410 is at least one of Docker Swarm®, Kubernetes®, Cloud Foundry® Diego, Apache® Mesos™, and the like.

Orchestration layer 410 can maintain (e.g., create and update) metadata 430. Metadata 430 can include reliable and authoritative metadata concerning containers (e.g., containers $340_{1,1}$-$340_{W,Z}$).

FIG. 5A illustrates metadata example 500A, a non-limiting example of metadata 430 (FIG. 4). By way of illustration, metadata example 500A indicates for a container at least one of: an image name (e.g., file name including at least one of a network device (such as a host, node, or server) that contains the file, hardware device or drive, directory tree (such as a directory or path), base name of the file, type (such as format or extension) indicating the content type of the file, and version (such as revision or generation number of the file)), an image type (e.g., including name of an application or service running), the machine with which the container is communicating (e.g., IP address, host name, etc.), and a respective port through which the container is communicating, and other tag and/or label (e.g., a (user-configurable) tag or label such as a Kubernetes® tag, Docker® label, etc.), and the like. In various embodiments, metadata 430 (FIG. 4) is generated by orchestration layer 410 (FIG. 4)—which manages and deploys containers—and can be very timely (e.g., metadata is available soon after an associated container is created) and highly reliable (e.g., accurate). In addition or alternative to metadata example 500A, other metadata may comprise metadata 430 (FIG. 4). For example, other elements (e.g., service name, (user-configurable) tag and/or label, and the like) associated with models 440 (FIG. 4) are used. By way of further non-limiting example, metadata 430 (FIG. 4) includes an application determination using application identification (AppID). AppID can process data packets at a byte level and can employ signature analysis, protocol analysis, heuristics, and/or behavioral analysis to identify an application and/or service. In some embodiments, AppID inspects only a part of a data payload (e.g., only parts of some of the data packets). By way of non-limiting example, AppID is at least one of Cisco Systems® OpenAppID, Qosmos ixEngine®, Palo Alto Networks® APP-ID™, and the like.

Referring back to FIG. 4, enforcement point 250 can receive metadata 430, for example, through application programming interface (API) 420. Other interfaces can be used to receive metadata 430. In some embodiments, enforcement point 250 can include models 440. Models 440 can include a model of expected (network communications) behavior for an image type. For example, expected (network communications) behaviors can include at least one of: protocols and/or ports that should be used by a container and who the container should talk to (e.g., relationships between containers, such as other applications and/or services the container should talk to), and the like.

In some embodiments, models 440 include a model of expected (network communications) behavior for applications and/or services running in a VM (e.g., of VMs $260_1$-$260_V$ shown in FIG. 2). In various embodiments, models 440 are modifiable by an operator, such that security policy is adapted to the evolving security challenges confronting the IT organization. For example, the operator provides permitted and/or forbidden (network communications) behaviors via at least one of a graphical user interface (GUI), command-line interface (CLI), application programming interface (API), and the like (not depicted in FIG. 4).

FIG. 5B shows table 500B representing model 440 (FIG. 4) including non-limiting examples of expected behaviors, according to some embodiments. For example, database server 510B can be expected to communicate using transmission control protocol (TCP), common secure management applications, and Internet Small Computer System (iSCSI) TCP. By way of further non-limiting example, database server 510B can be expected to communicate with application servers, other database servers, infrastructure management devices, and iSCSI target. In some embodiments, if database server 510B were to communicate with a user device using Hypertext Transfer Protocol (HTTP), then such a deviation from expected behavior could be used at least in part to detect a security breach.

By way of additional non-limiting example, file server 520B (e.g., HTTP File Server or Hierarchical File System (HFS)) can be expected to communicate using HTTP and common secure management applications. For example, file server 520B can be expected to communicate with application servers and infrastructure management devices. In various embodiments, if file server 520B were to communicate with a user device using Hypertext Transfer Protocol (HTTP), then such a deviation from expected behavior could be used at least in part to detect a security breach.

Many other deviations from expected behavior are possible. Additionally, other different combinations and/or permutations of services, protocols (e.g., Advanced Message Queuing Protocol (AMQP), Domain Name Servers (DNS), Dynamic Host Configuration Protocol (DHCP), Network File System (NFS), Server Message Block (SMB), User Datagram Protocol (UDP), and the like) and common ports, communication partners, direction, and application payload and/or message semantics (e.g., Secure Shell (SSH), Internet Control Message Protocol (ICMP), Structured Query Language (SQL), and the like), including ones not depicted in FIG. 5B may be used. Enforcement point 250 can be realized in at least one of a bare-metal server, virtual, and container environments.

Referring back to FIG. 4, using metadata 430 and models 440, enforcement point 250 applies heuristics to generate a high-level declarative security policy associated with a container (e.g., of containers $340_{1,1}$-$340_{W,Z}$), according to some embodiments. A high-level security policy can comprise one or more high-level security statements, where there is one high-level security statement per allowed protocol, port, and/or relationship combination. In some embodiments, enforcement point 250 determines an image type using metadata 430 and matches the image type with one or more models 440 associated with the image type. For example, if/when the image type corresponds to a certain database application, then one or more models associated with that database are determined. A list of at least one of: allowed protocols, ports, and relationships for the database may be determined using the matched model(s).

In various embodiments, enforcement point 250 produces a high-level declarative security policy for the container using the list of at least one of: allowed protocols, ports, and relationships. The high-level declarative security policy can be at least one of: a statement of protocols and/or ports the container is allowed to use, indicate applications/services that the container is allowed to communicate with, and indicate a direction (e.g., incoming and/or outgoing) of permitted communications. According to some embodiments, single application/service is subsequently used to identify several different machines associated with the single application/service. The high-level declarative security policy is at a high level of abstraction, in contrast with low-level firewall rules, which are at a low level of abstraction and only identify specific machines by IP address and/or hostname. Accordingly, one high-level declarative security statement can be compiled to produce hundreds or more of low-level firewall rules.

The high-level security policy can be compiled by enforcement point 250 (or other machine) to produce a low-level firewall rule set. Compilation is described further in related U.S. Patent Application "Conditional Declarative Policies" (application Ser. No. 14/673,640) filed Mar. 30, 2015, which is hereby incorporated by reference for all purposes.

According to some embodiments, a low-level firewall rule set is used by enforcement point 250 to determine when the high-level security policy is (possibly) violated. For example, a database (e.g., in a container of containers $340_{1,1}$-$340_{W,Z}$) serving web pages using the Hypertext Transfer Protocol (HTTP) and/or communicating with external networks (e.g., network 110 of FIG. 1) could violate a high-level declarative security policy for that database container. In various embodiments, enforcement point 250 is an enforcement point (e.g., in a container of containers $340_{1,1}$-$340_{W,Z}$). Enforcement points are described further in related U.S. Patent Application "Methods and Systems for Orchestrating Physical and Virtual Switches to Enforce Security Boundaries" (application Ser. No. 14/677,827) filed Apr. 2, 2015, which is hereby incorporated by reference for all purposes. Detection of a (potential) violation of the high-level security policy and violation handling are described further in related U.S. Patent Application "System and Method for Threat-Driven Security Policy Controls" (application Ser. No. 14/673,679) filed Mar. 30, 2015, which is hereby incorporated by reference for all purposes. For example, when a (potential) violation of the high-level security policy is detected, enforcement point 250 (or other machine) issues an alert and/or drops/forwards network traffic that violates the high-level declarative security policy.

Figure 6:
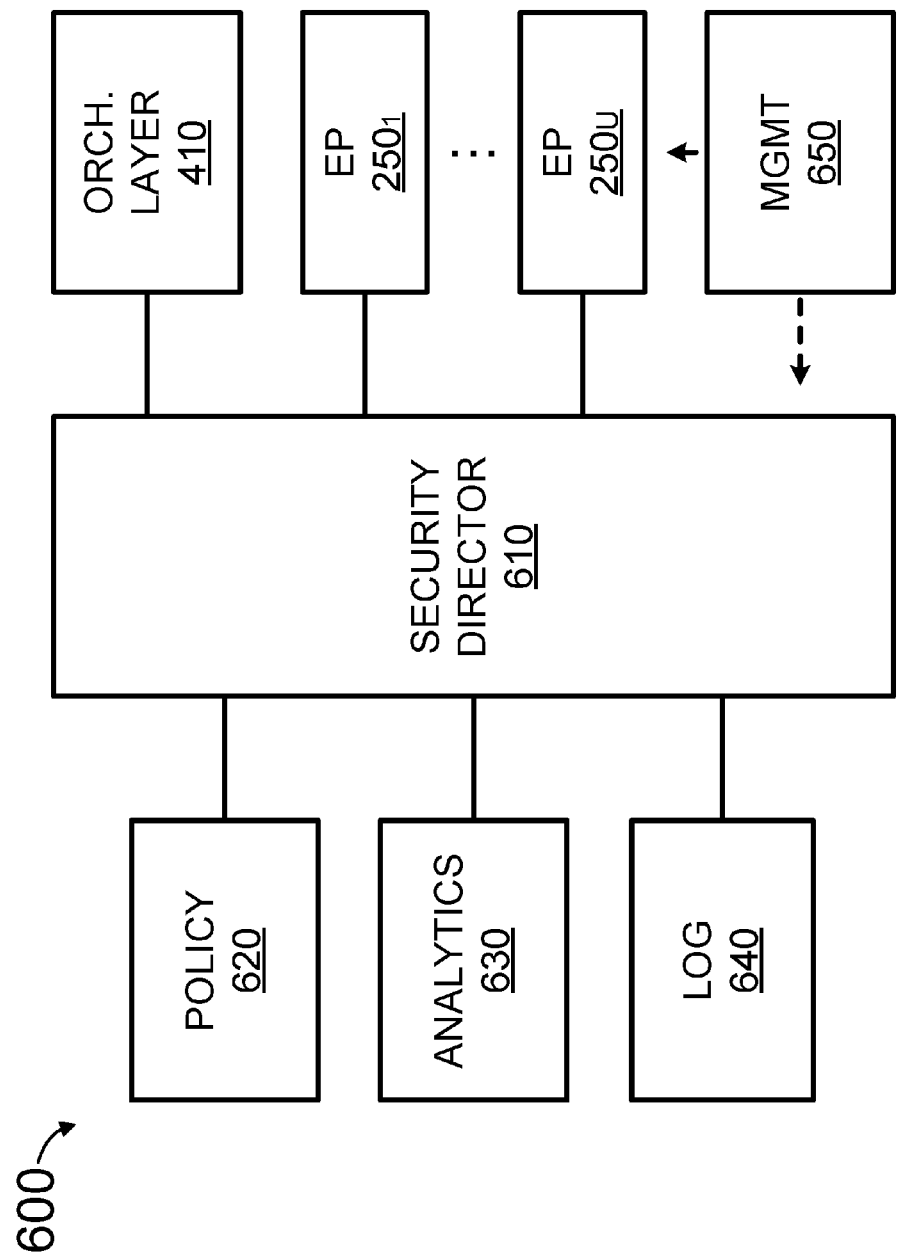
FIG. 6 is a simplified block diagram of a system, according to various embodiments.

FIG. 6 illustrates a simplified block diagram of system 600, according to some embodiments. System 600 may include security director 610, policy 620, analytics 630, log 640, management 650, orchestration layer 410, and enforcement points $250_1$-$250_U$.

Security director 610 can receive metadata from orchestration layer 410 (FIG. 4), for example, through at least one of enforcement points $250_1$-$250_U$. For example, as described above in relation to FIG. 4, metadata from orchestration layer 410 can be reliable and authoritative metadata concerning containers, network topology, and the like (e.g., metadata 430 (FIG. 4)). For example, when a container (e.g., of containers $340_1$-$340_z$ (FIG. 3) and $340_{1,1}$-$340_{W,Z}$ (FIG. 4)) is deployed, the container is assigned an (IP) address, which may be included in metadata received from orchestration layer 410.

Security director 610 can also be communicatively coupled to enforcement points $250_1$-$250_U$. For example, security director 610 disseminates respective low-level security policies to enforcement points $250_1$-$250_U$, each security policy applicable to a respective one of enforcement points $250_1$-$250_U$. By way of further non-limiting example, security director 610 receives information logged by enforcement points $250_1$-$250_U$, as described above in relation to FIG. 2 and stores it in log 640.

According to some embodiments, policy 620 is a data store of high-level declarative security policies and/or low-level firewall rule sets. A data store can be a repository for storing and managing collections of data such as databases, files, and the like, and can include a non-transitory storage medium (e.g., mass data storage 930, portable storage device 940, and the like described in relation to FIG. 9).

In various embodiments, analytics 630 provides computational analysis for data network security. For example, analytics 630 compiles high-level declarative security policies into low-level firewall rule sets. By way of further non-limiting example, analytics 630 analyzes log 640 for malicious behavior, and the like.

In accordance with some embodiments, log 640 is a data store of information logged by enforcement points $250_1$-$250_U$, as described above in relation to FIG. 2. A data store can be a repository for storing and managing collections of data such as databases, files, and the like, and can include a non-transitory storage medium (e.g., mass data storage 930, portable storage device 940, and the like described in relation to FIG. 9).

Management 650 can dynamically commission (spawn/launch) and/or decommission instances of security director 610 and/or enforcement points $250_1$-$250_U$. In this way, computing resources can be dynamically added to, reallocated in, and removed from an associated data network, and microsegmentation is maintained. For example, as containers (e.g., of containers $340_1$-$340_Z$ (FIG. 3)) are added (and removed) instances of security director 610 and/or enforcement points $250_1$-$250_U$ are added (and removed) to provide security.

Figure 7:
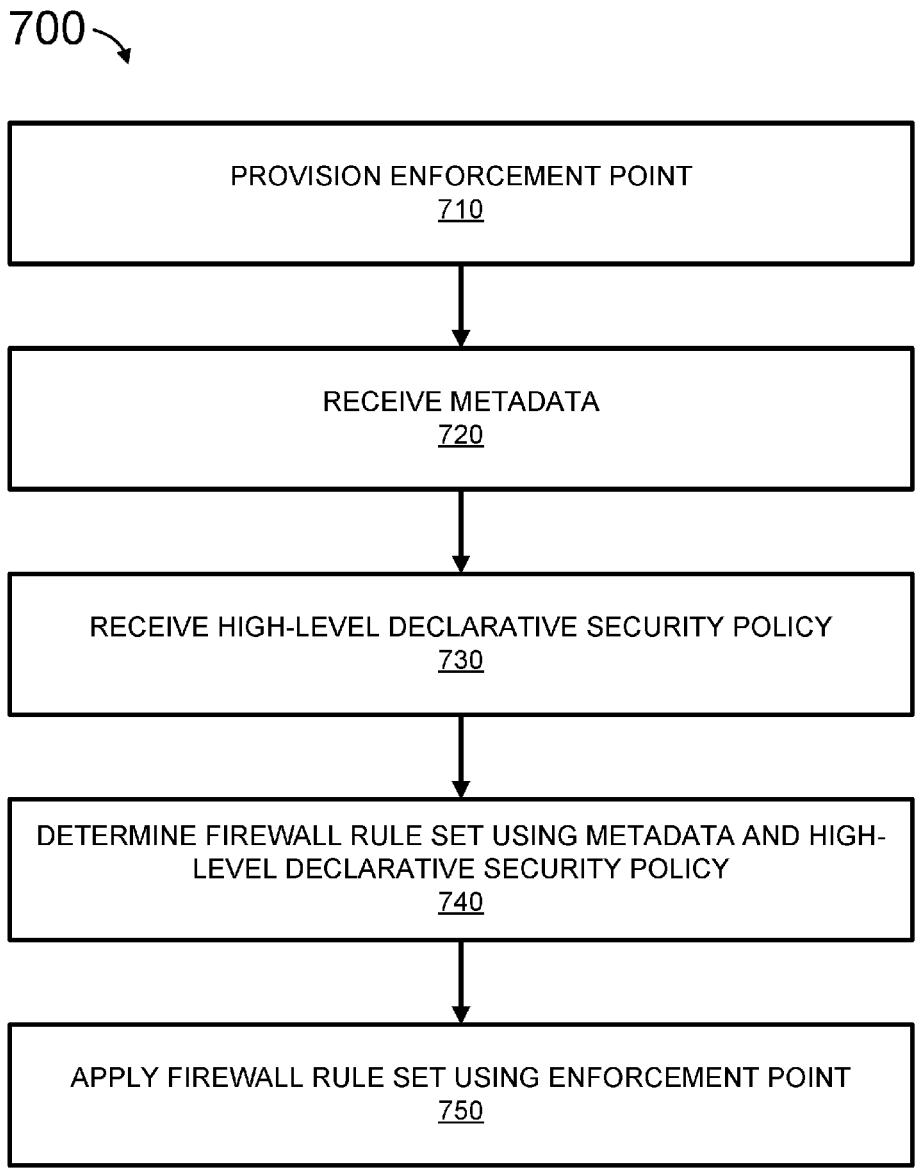
FIG. 7 is a flow diagram of a method, in accordance with various embodiments.

FIG. 7 depicts method (or process) 700 for microsegmentation in data networks. In various embodiments, method 700 is performed by system 600 (FIG. 6). At step 710, an enforcement point is provisioned. For example, an enforcement point of enforcement points $250_1$-$250_V$ (FIG. 2) and/or 250 (FIGS. 3 and 4) is commissioned by management 650 (FIG. 6). By way of non-limiting example, the enforcement point can run on a bare metal server (e.g., physical hosts $160_{1,1}$-$160_{x,y}$ (FIG. 1)), VM (e.g., of VMs $260_1$-$260_V$ (FIG. 2)), and container (e.g., of containers $340_1$-$340_Z$ (FIG. 3) and $340_{1,1}$-$340_{W,Z}$ (FIG. 4)). The enforcement point may be communicatively coupled to a virtual switch (e.g., virtual switch 240 (FIGS. 2 and 3)) and security director 610 (FIG. 6). In some embodiments, the enforcement point can program the virtual switch (e.g., when upon provisioning). For example, the enforcement point can program the virtual switch to direct all data communications (e.g., network packets such as IP packet) to the enforcement point in addition to or instead of their respective indicated destination (e.g., as indicated by a destination network address such as an IP address, destination port, etc.).

At step 720, metadata is received. For example, security director 610 (FIG. 6) received metadata from orchestration layer 410 (FIG. 4). At step 730, a (high-level) declarative security policy is received. As explained above with respect to FIG. 4, the high-level declarative security policy is an intent-driven model which defines groups of bare metal servers (e.g., physical hosts $160_{1,1}$-$160_{x,y}$ (FIG. 1)), VMs (e.g., of VMs $260_1$-$260_V$ (FIG. 2)), and containers (e.g., of containers $340_1$-$340_Z$ (FIG. 3) and $340_{1,1}$-$340_{W,Z}$ (FIG. 4)), and describes permitted connectivity, security, and network services between groups. Since the declarative security policy is at a high level of abstraction (e.g., compared to a firewall rule set), rules between each and every single entity in a network are not needed (or desired). Instead, a statement/model in the high-level declarative security policy can be applicable to several entities in the network (e.g., in a group).

At step 740, a (low-level) firewall rule set is determined using the received metadata and the (high-level) declarative security policy. For example, analytics 630 (FIG. 6) compiles the (high-level) declarative security policy using the received metadata from orchestration layer 410 to generate a firewall rule set.

At step 750, an enforcement point applies the firewall rule set to communications through a network switch. For example, the enforcement point (e.g., of enforcement points $250_1$-$250_V$ (FIG. 2) and/or 250 (FIGS. 3 and 4)) can program virtual switch 240 (FIG. 2 and FIG. 3) such that communications (e.g., network packets such as IP packets) are forwarded to their respective destination, dropped, or forwarded to an alternative destination (e.g., honeypot, tarpit, canary trap, etc.).

Application of the firewall rule set as described above can be used to microsegment a data network. In other words, entities on the data network (e.g., physical servers, VMs, containers, etc.) can be grouped into segments, where communications among entities within a group are permitted and optionally limited by such characteristics as source/destination ports, protocols used, applications used, the like, and combinations thereof. Communications among entities in different groups can be restricted, for example, not permitted at all and/or limited by a more restrictive set of characteristics than are generally permitted within a group. Since an enforcement point can be provisioned for each network switch and each entity on the network communicates through the network switch, the segmentation of the network (e.g., division effectively into groups of any size) can be highly granular. Hence the data network can be said to be microsegmented. By way of non-limiting example, there is an enforcement point (e.g., of enforcement points $250_1$-$250_V$ (FIG. 2) and/or 250 (FIG. 3 and FIG. 4)) provisioned for each virtual switch (e.g., virtual switch 240 (FIGS. 2 and 3)) and each container (e.g., of containers $340_1$-$340_Z$ (FIG. 3) and $340_{1,1}$-$340_{W,Z}$ (FIG. 4)) communicates through the virtual switch.

Figure 8:
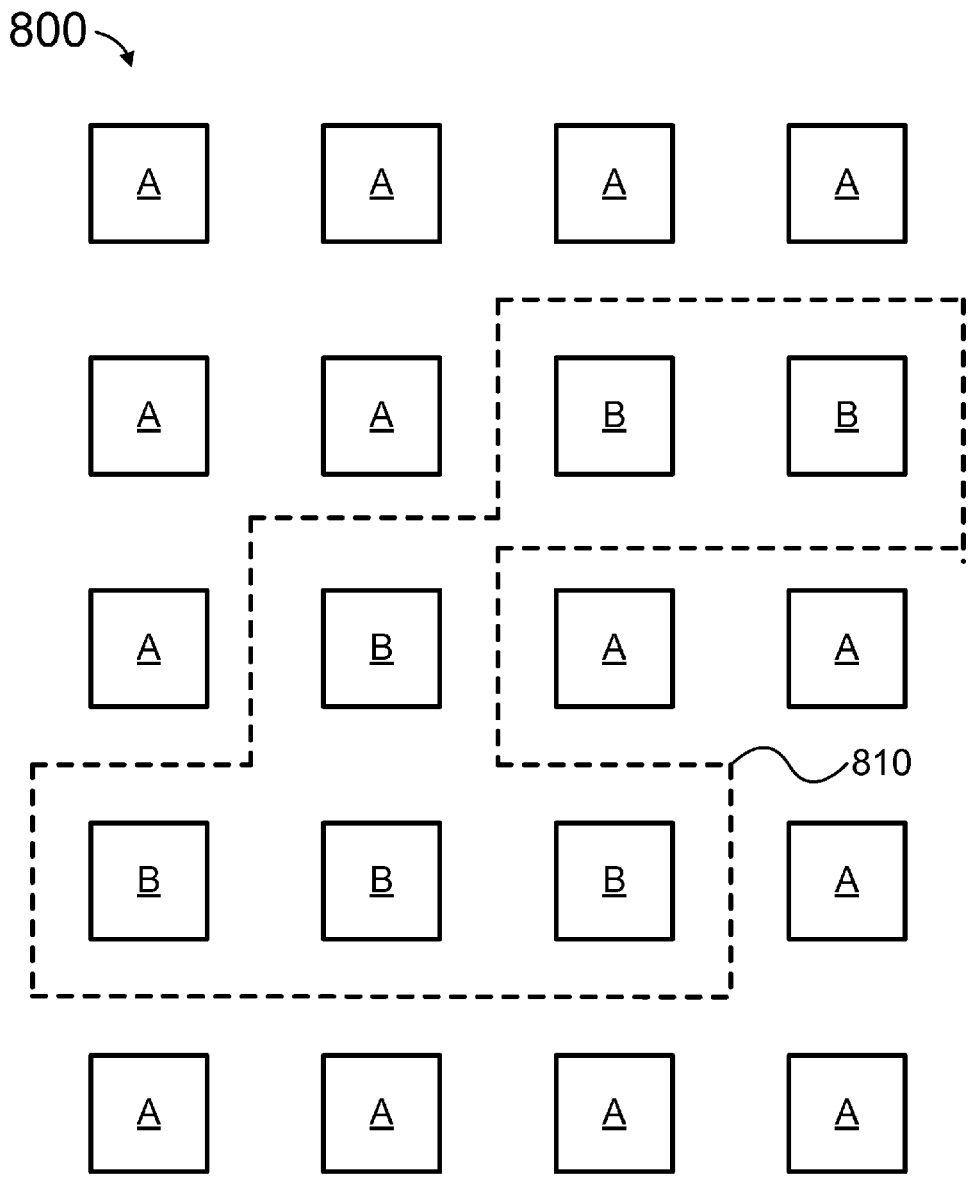
FIG. 8 is a simplified block diagram of a microsegmented computer network, according some embodiments.

FIG. 8 is a non-limiting example of granular segmentation (e.g., microsegmentation), according to various embodiments. A data network comprises a plurality of network entities 800, such as bare metal servers (e.g., physical hosts $160_{1,1}$-$160_{x,y}$ (FIG. 1)), VMs (e.g., of VMs $260_1$-$260_V$ (FIG. 2)), and containers (e.g., of containers $340_1$-$340_Z$ (FIG. 3) and $340_{1,1}$-$340_{W,Z}$ (FIG. 4)). The network entities 800 are associated with Group A (denoted by "A") or Group B (denoted by "B"). Communications between Group A and Group B are more restricted (e.g., for security reasons) and communications within Group B are less restricted (e.g., for business purposes).

As shown in FIG. 8, entities in Group B can be disposed throughout network entities 800 without limitation. For example, entities in Group B need not be limited to entities connected to the same network server, running on the same VM, running in the same physical server, running in physical servers in the same rack, running in the same data center, and the like. Communication between Group A and Group B, and communication within Group B can still be controlled, regardless of where entities associated with Group B are disposed. The microsegment comprised of Group B entities is denoted by microsegment 810.

As depicted in FIG. 8, separate networks (e.g., segments, microsegments, etc.) can be affected regardless of the actual network topology. By way of non-limiting example, a hierarchical network topology can be affected when the physical network topology is flat. In this way, the operation of a (flat) data network is altered to provide microsegmentation of the data network.

Figure 9:
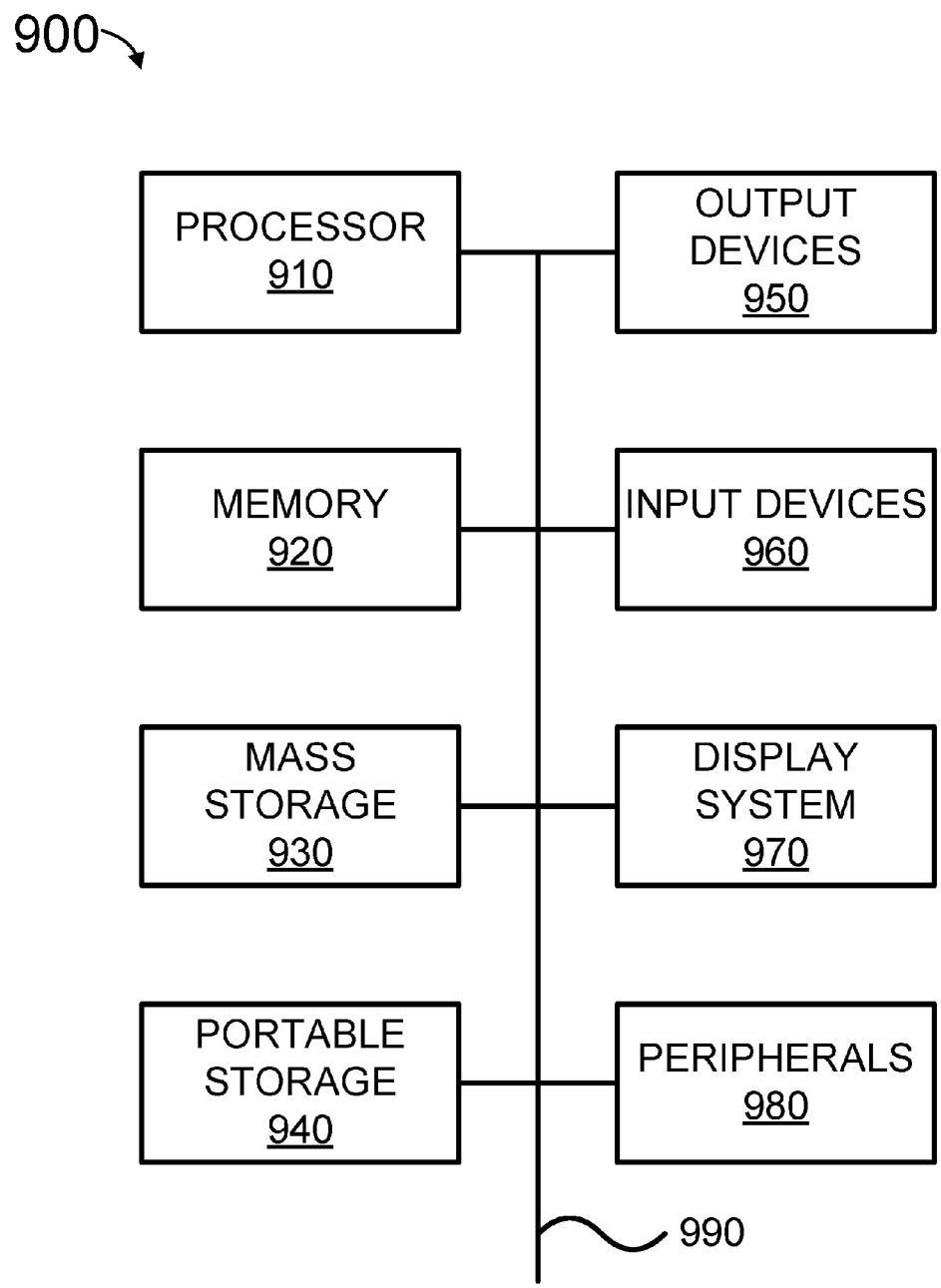
FIG. 9 is simplified block diagram of a computing system, in accordance with some embodiments.

FIG. 9 illustrates an exemplary computing system 900 that may be used to implement some embodiments of the present invention. The computing system 900 in FIG. 9 may be implemented in the contexts of the likes of computing systems, networks, servers, or combinations thereof. The computing system 900 in FIG. 9 includes one or more processor unit(s) 910 and main memory 920. Main memory 920 stores, in part, instructions and data for execution by processor unit(s) 910. Main memory 920 stores the executable code when in operation, in this example. The computing system 900 in FIG. 9 further includes a mass data storage 930, portable storage device 940, output devices 950, user input devices 960, a graphics display system 970, and peripheral device(s) 980.

The components shown in FIG. 9 are depicted as being connected via a single bus 990. The components may be connected through one or more data transport means. Processor unit(s) 910 and main memory 920 are connected via a local microprocessor bus, and the mass data storage 930, peripheral device(s) 980, portable storage device 940, and graphics display system 970 are connected via one or more input/output (I/O) buses.

Mass data storage 930, which can be implemented with a magnetic disk drive, solid state drive, or an optical disk drive, is a non-volatile storage device for storing data and instructions for use by processor unit(s) 910. Mass data storage 930 stores the system software for implementing embodiments of the present disclosure for purposes of loading that software into main memory 920.

Portable storage device 940 operates in conjunction with a portable non-volatile storage medium, such as a flash drive, floppy disk, compact disk, digital video disc, or Universal Serial Bus (USB) storage device, to input and output data and code to and from the computing system 900 in FIG. 9. The system software for implementing embodiments of the present disclosure is stored on such a portable medium and input to the computing system 900 via the portable storage device 940.

User input devices 960 can provide a portion of a user interface. User input devices 960 may include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computing system 900 as shown in FIG. 9 includes output devices 950. Suitable output devices 950 include speakers, printers, network interfaces, and monitors.

Graphics display system 970 include a liquid crystal display (LCD) or other suitable display device. Graphics display system 970 is configurable to receive textual and graphical information and processes the information for output to the display device.

Peripheral device(s) 980 may include any type of computer support device to add additional functionality to the computer system.

The components provided in the computing system 900 in FIG. 9 are those typically found in computer systems that may be suitable for use with embodiments of the present disclosure and are intended to represent a broad category of such computer components that are well known in the art. Thus, the computing system 900 in FIG. 9 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 900 may be implemented as a cloud-based computing environment, such as a virtual machine operating within a computing cloud. In other embodiments, the computing system 900 may itself include a cloud-based computing environment, where the functionalities of the computing system 900 are executed in a distributed fashion. Thus, the computing system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 900, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for microsegmentation of data networks comprising:
   receiving a high-level declarative policy, the high-level declarative policy based on metadata associated with a plurality of containers from an orchestration layer;
   determining a low-level firewall rule set using the high-level declarative policy; and
   configuring, by a plurality of enforcement points, a respective virtual switch of a plurality of virtual switches to process packets in accordance with the low-level firewall ruleset, the virtual switches being collectively communicatively coupled to the plurality of containers, such that network communications between a first group of containers and a second group of containers of the plurality of containers are restricted by a first set of characteristics, and communications between containers of the first group of containers are at least one of permitted and restricted by a second set of characteristics; and wherein the metadata includes at least one of an image name, an image type, service name, ports, tags and labels associated with the plurality of containers.

2. The computer-implemented method of claim 1, wherein the high-level declarative policy is further based on at least one model associated with the metadata.

3. The computer-implemented method of claim 2, wherein the plurality of enforcement points matches the metadata with the at least one model to determine a list of at least one of allowed protocols, ports and relationships for the plurality of containers.

4. The computer-implemented method of claim 1, wherein an enforcement point of the plurality of enforcement points runs on a container close in physical proximity to at least one container of the plurality of containers, communications of the at least one container of the plurality of containers being controlled by the enforcement point.

5. The computer-implemented method of claim 1, further comprising:
dynamically commissioning a new enforcement point in response to a new container being added to the plurality of containers.

6. The computer-implemented method of claim 1, further comprising:
provisioning a new enforcement point, the new enforcement point being communicatively coupled with a virtual switch of the plurality of virtual switches, the virtual switch being communicatively coupled to at least one container of the plurality of containers; and
programming the virtual switch of the plurality of virtual switches to forward received network packets to the new enforcement point, the virtual switch being communicatively coupled to the at least one container.

7. The computer-implemented method of claim 1, further comprising:
receiving, by an enforcement point of the plurality of enforcement points, network traffic from a virtual switch;
detecting the network traffic violates the high-level declarative policy; and
at least one of issuing an alert, dropping the network traffic, and forwarding the network traffic.

8. The computer-implemented method of claim 1, wherein the high-level declarative policy specifies groups of containers and describes permitted connectivity, security and network services between the groups of containers.

9. The computer-implemented method of claim 1, wherein at least one container in the first group of containers is running on a different physical server than at least one other container in the first group of containers.

10. A system for microsegmentation of data networks comprising:
a processor; and
a memory coupled to the processor, the memory storing instructions which are executable by the processor to perform a method comprising:
receiving a high-level declarative policy, the high-level declarative policy based on metadata associated with a plurality of containers from an orchestration layer;
determining a low-level firewall rule set using the high-level declarative policy; and
configuring, by a plurality of enforcement points, a respective virtual switch of a plurality of virtual switches to process packets in accordance with the low-level firewall ruleset, the virtual switches being collectively communicatively coupled to the plurality of containers, such that network communications between a first group of containers and a second group of containers of the plurality of containers are restricted by a first set of characteristics, and communications between containers of the first group of containers are at least one of permitted and restricted by a second set of characteristics; and wherein the metadata includes at least one of an image name, an image type, service name, ports, tags and labels associated with the plurality of containers.

11. The system of claim 10, wherein the high-level declarative policy is further based on at least one model associated with the metadata.

12. The system of claim 11, wherein the plurality of enforcement points matches the metadata with the at least one model to determine a list of at least one of allowed protocols, ports and relationships for the plurality of containers.

13. The system of claim 10, wherein an enforcement point of the plurality of enforcement points runs on a container close in physical proximity to at least one container of the plurality of containers, communications of the at least one container of the plurality of containers being controlled by the enforcement point.

14. The system of claim 10, further comprising:
dynamically commissioning a new enforcement point in response to a new container being added to the plurality of containers.

15. The system of claim 10, further comprising:
provisioning a new enforcement point, the new enforcement point being communicatively coupled with a virtual switch of the plurality of virtual switches, the virtual switch being communicatively coupled to at least one container of the plurality of containers; and
programming the virtual switch of the plurality of virtual switches to forward received network packets to the new enforcement point, the virtual switch being communicatively coupled to the at least one container.

16. The system of claim 10, further comprising:
receiving, by an enforcement point of the plurality of enforcement points, network traffic from a virtual switch;
detecting the network traffic violates the high-level declarative policy; and
at least one of issuing an alert, dropping the network traffic, and forwarding the network traffic.

17. The system of claim 10, wherein the high-level declarative policy specifies groups of containers and describes permitted connectivity, security, and network services between the groups of containers.

* * * * *